United States Patent [19]

Rabe

[11] Patent Number: 4,635,349

[45] Date of Patent: Jan. 13, 1987

[54] METHOD OF MAKING SINGLE PHASE MULTI-SPEED MOTOR

[75] Inventor: Jerry R. Rabe, Holland, Mich.

[73] Assignee: General Electric Company, Fort Wayne, Ind.

[21] Appl. No.: 291,509

[22] Filed: Aug. 10, 1981

Related U.S. Application Data

[62] Division of Ser. No. 20,182, Mar. 13, 1979, Pat. No. 4,296,344.

[51] Int. Cl.[4] ........................................ H02K 15/085
[52] U.S. Cl. ........................................ 29/596
[58] Field of Search .................. 29/596; 310/179, 180, 310/184, 185, 198-208, 72, 216; 318/771-777

[56] References Cited

U.S. PATENT DOCUMENTS

| | | | |
|---|---|---|---|
| 1,525,022 | 3/1925 | Blathy | 310/202 |
| 2,671,879 | 3/1954 | Schwarz | 310/184 |
| 2,774,024 | 11/1956 | Brammerlo | 310/184 |
| 2,947,894 | 8/1960 | Strang | 310/202 |
| 3,114,093 | 12/1963 | Fricke | 310/198 |
| 3,153,183 | 10/1964 | Brammerlo | 310/184 |
| 3,153,184 | 10/1964 | Stout | 310/184 |
| 3,204,167 | 8/1965 | Zigler | 310/198 |
| 3,260,910 | 7/1966 | Spindler | 310/198 |
| 3,295,034 | 12/1966 | Herzog | 310/184 |
| 3,447,225 | 6/1969 | Eminger | 29/732 |
| 3,535,572 | 10/1970 | De Rugeris | 310/185 |
| 4,066,937 | 1/1978 | Pfarrer | 310/198 |
| 4,100,444 | 7/1978 | Boyd | 310/200 |
| 4,107,583 | 8/1978 | Houtman | 310/198 |

FOREIGN PATENT DOCUMENTS

1006059 11/1957 Fed. Rep. of Germany ...... 310/200

Primary Examiner—Howard N. Goldberg
Assistant Examiner—P. W. Echols
Attorney, Agent, or Firm—Ralph E. Krisher, Jr.

[57] ABSTRACT

The efficiency of a multi-speed motor is optimized for the speed at which the motor is to be most frequently operated by first predetermining the expected most frequently used motor speed and then forming a start winding having a number of starting poles corresponding to the expected most frequently used motor speed from conductor material having a greater cross-sectional area than that of the conductor material employed in such a motor previously. The start winding is placed in selected slots of a stator core already containing a main winding so as to be in quadrature with the effect of the main winding when the main winding is connected in the most frequently used speed configuration. Another start winding having a number of starting poles corresponding to an expected less frequently used motor speed is formed and placed in the stator core radially inwardly of the main winding and the previous start winding with the number of coil turns in the innermost start winding, which are placed in core slots already containing other coil turns, being generally proportioned to the remaining available slot space. There is thereby created an improved stator for a multi-speed motor wherein the more frequently used start or auxiliary winding is formed as a number of winding pole groups for establishing magnetic poles located midway between adjacent main winding poles established during the more frequently used speed configuration. Further, the less frequently employed start winding may be distributed in given stator core slots in proportion to the cross-sectional area of the slot less the area of the slot occupied by the main and more frequently used auxiliary winding.

1 Claim, 8 Drawing Figures

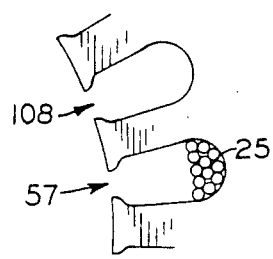 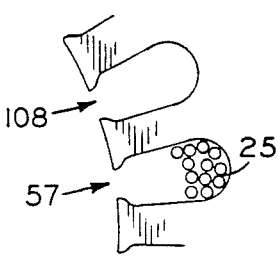 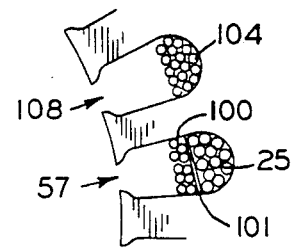
FIG. 3          FIG. 4          FIG. 5
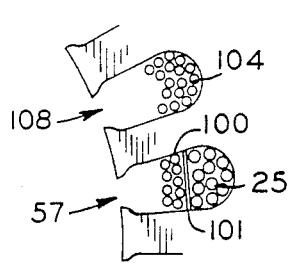 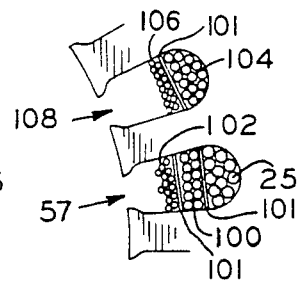 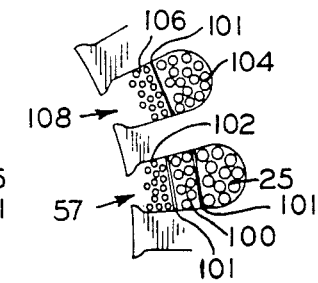
FIG. 6          FIG. 7          FIG. 8

METHOD OF MAKING SINGLE PHASE MULTI-SPEED MOTOR

CROSS REFERENCE TO RELATED APPLICATION

This application is a division of my application Ser. No. 20,182, filed Mar. 13, 1979, now U.S. Pat. No. 4,296,344 and the entire disclosure of which is incorporated herein by reference.

BACKGROUND OF THE INVENTION

The present invention relates generally to induction motors of the multi-speed variety and more particularly, to methods for enhancing the efficiency of stator arrangements in a low speed mode without deleteriously affecting the efficiency in a high speed mode.

Multi-speed or pole changing motors are well known in the art. For example, induction motors have been designed having separate main windings with differing numbers of poles and separate start or auxiliary windings also having differing numbers of poles corresponding to the numbers of poles of the separate main windings. One main winding and one auxiliary winding are operational in one speed mode, and another main winding and another auxiliary winding are operational in a different speed mode. With winding arrangements of this type, there are, for a given speed mode, at least two windings which are not used, but which occupy stator core slot space thereby reducing the overall efficiency of the motor. Initial cost of the motor is also increased because the additional windings require additional slot space and additional winding material which is effectively unused in a given speed mode.

Other pole changing winding arrangements have been devised wherein a portion of the main and/or start winding is utilized in more than one speed mode. Thus, for example, a two speed motor may be devised by interconnecting the pole groups of a main winding and a start winding so that adjacent main poles or adjacent start poles are of dissimilar polarity for one speed of operation and those same adjacent pole groups are of a like polarity with induced opposite poles therebetween giving rise to a speed mode which is half the original speed. Other known arrangements include the use of a portion only of one or more of the windings. For example, the use of alternate ones only of the pole groups interconnected so that those alternate ones are of a differing magnetic polarity give rise to a mode of operation having effectively half the number of poles of the normal mode of operation for that winding. Such features may be employed for both a main winding and a starting or auxiliary winding, or for only one of such windings.

In still other known arrangements, frequently in conjunction with centrifugal or other start switching arrangements, multiple running windings are used in conjunction with a single start winding and the motor is always started in one speed configuration and then run on a selected one of the main or running windings.

Yet other known arrangements have met with particular success in configurations where the auxiliary winding continues to be energized during the running of the motor. Typical of these motor arrangements are the capacitor start, capacitor run circuit configurations. These configurations are often employed in conjunction with a switch such as, for example, a centrifugal switch, a current relay, or voltage sensing relay to change the effective capacitance of the auxiliary winding circuit. Such motors are frequently employed where significant starting torque is required such as, for example, in hermetic motor applications where the motor provides the driving force for a hermetically sealed compressor. One such known motor is a single phase, alternating current, pole changing motor which is operable in either of two speed modes. The motor includes a main winding having a plurality of pole groups disposed in selected stator core slots with the main winding operable in either speed mode to provide a magnetic field for motor operation. This motor may, for example, have two main winding pole groups connectable in a first configuration for two pole operation with two wound or actual magnetic poles, and connectable in a second configuration with two wound poles of like magnetic polarity and two consequent or induced poles for four pole operation. A first start winding for the lower speed mode of operation is shifted slightly from true quadrature with the corresponding poles created by the main winding because of power factor considerations and this first start winding lies radially innermost on the stator core. A second start or auxiliary winding for the higher speed mode of operation is disposed radially intermediate the first start winding and the main winding. The amount of wire which may be employed in the lower speed start winding in this known configuration is limited. Furthermore, a motor of this type frequently has a major portion of its operating time in the lower speed configuration and thus, it would be beneficial to increase the efficiency of such a motor in this lower speed range mode.

SUMMARY OF THE INVENTION

Among the several objects of the present invention may be noted methods resulting in: the improvement of the utilization of stator core slot area; the provision of a more efficient two speed motor; the improvement of the efficiency of a pole changing motor in one speed mode without adversely affecting efficiency in other speed modes; the reordering and redistributing of windings in an induction motor with a view toward improving the efficiency thereof; and the improvement in efficiency of a multi-speed motor at the most frequently used speed without deleteriously affecting efficiency in other speed modes.

In carrying out the present invention, in one form thereof, windings are disposed in selected slots of a slotted magnetic core by inserting a main winding which is arranged to be connected in either of two running configurations corresponding to two different ranges of motor operating speed and by inserting a first start or auxiliary winding comprising a number of pole groups corresponding to one of the main winding running configurations. The space available in each slot for receiving a second auxiliary winding, which is generally of a lesser number of pole groups than the first auxiliary winding, is then determined. The number of turns in individual coils of each pole group of the second auxiliary winding is distributed according to the determined available space to generally balance the percentage slot fill for each slot in the core when all three windings have been inserted. The first auxiliary winding may be inserted in the core with the pole groups thereof angularly displaced about ninety electrical degrees from corresponding main poles. Additional main winding coils, which are utilized in the higher speed configuration to augment the magnetic field created by the main winding, may also be disposed in stator slots. The additional main winding coils or extended main winding will frequently comprise a pair of coils utilized in a two pole motor configuration but unused in a four pole configuration.

In carrying out the present invention in a specific form thereof, a single phase alternating current pole changing motor is provided which is operable at least in a first lower speed mode and a second higher speed mode. The motor includes a main winding which is energized in both speed modes; a lower speed auxiliary winding which is energizable at least to start the motor in the first mode while remaining inactive in the second mode; and a higher speed auxiliary winding which is energizable at least to start the motor in the second mode while remaining inactive in the first mode. The lower speed auxiliary winding is disposed in stator core slots radially intermediate the main winding and and the higher speed auxiliary winding. The main winding may comprise two pole groups selectively connectable to form four magnetic poles and, with the appropriate polarity reversals, to form a two pole winding. A pair of additional main winding coils may be provided which are operative only in the higher speed mode to augment the main winding magnetic field. In this four pole or two pole example, the lower speed mode auxiliary winding is a four pole configuration disposed in electrical quadrature to the main poles when the main winding is connected to create four magnetic poles.

The subject matter which I regard as my invention is set forth in the appended claims. The invention itself, however, along with further objects and advantages thereof will be understood by referring to the following description taken in connection with the accompanying drawings.

BRIEF DESCRIPTION OF THE DRAWINGS

FIGS. 3-8 depict exemplary stator core slots at various stages of manufacture and illustrating the percentage slot fill balance achievable according to the techniques of the present invention.

DESCRIPTION OF THE PREFERRED EMBODIMENT

Figure 1:
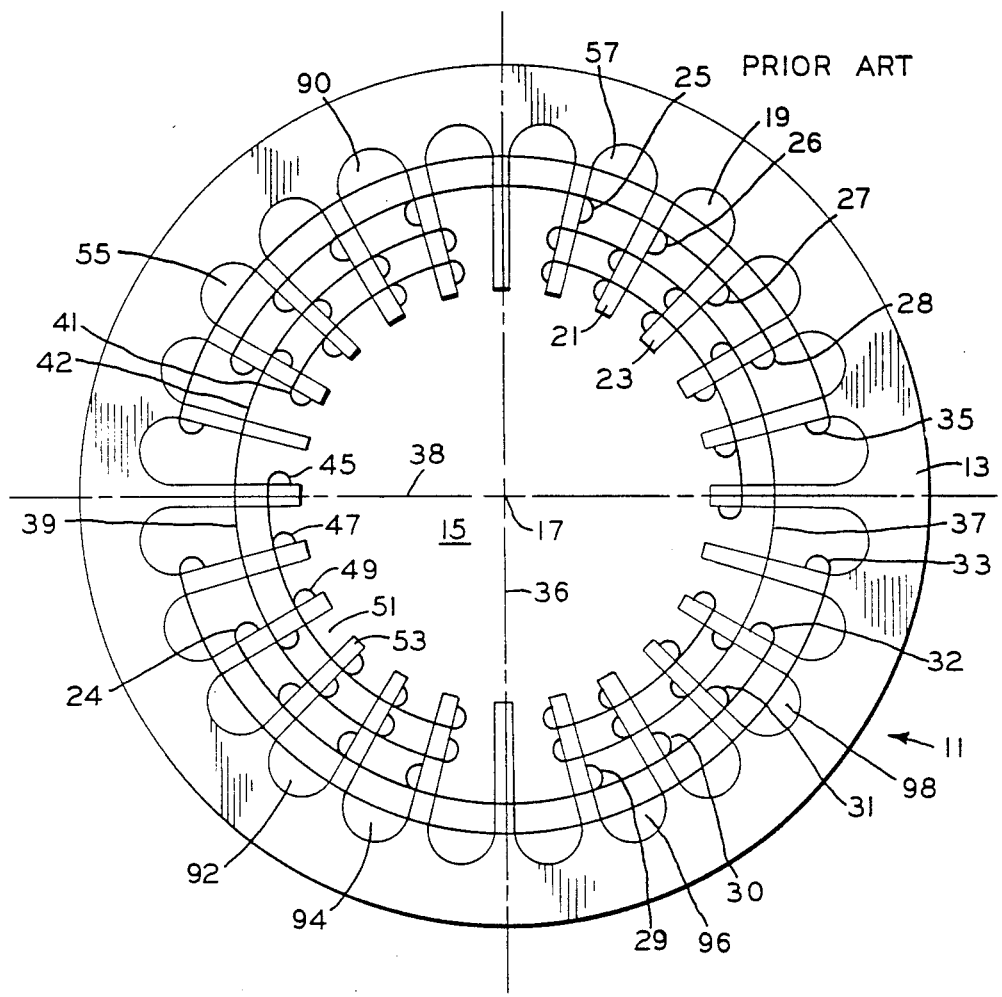
FIG. 1 is an axial view of an illustrative stator core schematically depicting winding placement according to the prior art to illustrate the improvement in slot overcrowding achievable according to the present invention.
Figure 2:
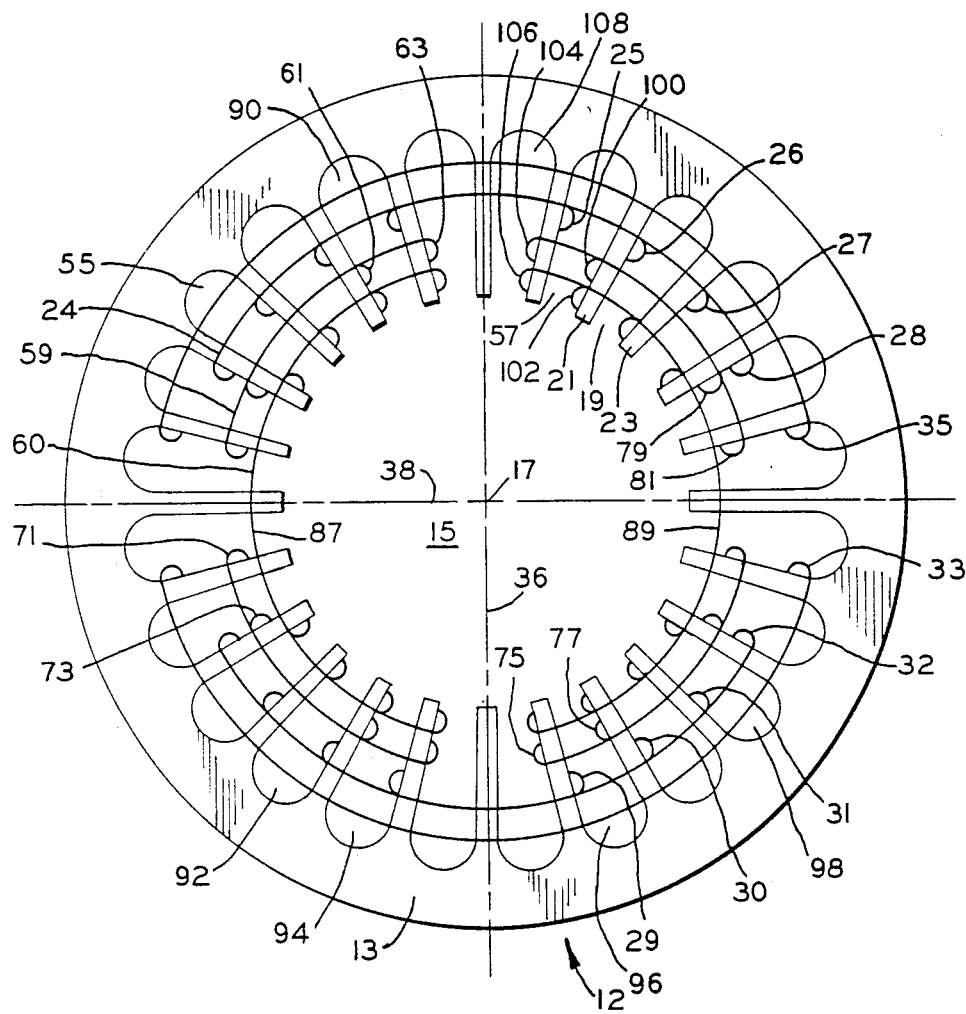
FIG. 2 is an axial view of a stator core similar to FIG. 1, schematically illustrating the winding placement according to the present invention in one form thereof.

Referring now to the drawings in general and primarily to FIGS. 1 and 2, wound stators or stator assemblies 11 and 12 for multi-speed or pole changing motors are seen to include a stator core 13 which may be of conventional design and comprise a stack of laminations of magnetic material. The stator core is provided with an axially extending bore 15 for accepting a rotor which may be, for example, of the squirrel cage variety, for rotation within the bore about centrally located or axially extending axis 17. The stator core 13 further includes a plurality of axially extending core slots, such as slot 19, which communicate with the bore and which are generally parallel to the axis 17. Each of the slots is defined by a pair of adjacent stator core teeth such as teeth 21 and 23. Each of the stator assemblies or wound stators include various stator windings comprising a plurality of coils having side turn portions thereof accommodated within the axially extending core slots. End turn portions of the coils are disposed about ends or faces of the stator cores (as illustrated for one core face in FIGS. 1 and 2), and connect the side turn portions of their respective coils. The depicted end turn portions in FIGS. 1 and 2 appear as but a single turn of wire; however, it will be understood that numerous turns of wire will be normally employed in forming each coil.

Each of stator assemblies 11 and 12 of FIGS. 1 and 2 respectively, include a main winding 24 disposed radially outermost in the stator core 13 with the main winding comprising two pole groups of four coils each to form a two pole main winding. Thus, coils 25, 26, 27 and 28 are concentrically positioned to form one pole group of the main winding. An adjacent set of concentric coils 29, 30, 31 and 32 form an adjacent main winding pole group. The pole group comprising the coils 29-32 will be electrically connected to be of a magnetic polarity opposite that of the pole group comprising coils 25-28 when the main winding is in its two pole configuration thereby establishing two magnetic poles which define a polar axis 36. To reconnect the main winding into a four pole configuration, the direction of current for one of these two pole groups is effectively reversed so that the two adjacent pole groups are at any given time of the same magnetic polarity. This reconnection of the main winding induces two consequent poles of like magnetic polarity with each being midway between the actual wound poles and which define a polar axis 38. To augment the magnetic field produced by the main winding during the two pole operational mode, an extended main winding comprising coils 33 and 35 may be provided with the coils being disposed so as to effectively increase the angular expanse or span of each of the main winding pole groups.

According to the prior art techniques as illustrated in FIG. 1, the main or running winding 24 having, for example, two pole groups comprising coils 25-28 and coils 29-32, is positioned in a stator core 13 of a motor which is to be operated in either a two pole or a four pole mode. Optionally, the extended main winding coils 33 and 35 may also be provided to augment the magnetic field of the main winding in its two pole operational mode. A four pole start winding 41 which is to be used at least to start the motor in its lower speed range mode, is disposed radially innermost of the main winding (i.e., adjacent the bore 15). As can be seen in FIG. 1, the effective centers of the pole groups of the four pole start windings are not symmetrical relative to the polar axes 36 and 38 (i.e., not displaced 90 electrical degrees from the axes) established by the main winding during its four pole operation. Thus, the four pole start winding is not in quadrature with the main winding. For example, the prior art four pole start winding has one of its pole groups identified as including the coils 45, 47, and 49. Note that this prior art four pole start winding coil group has its effective center in the middle of slot 51 while the center of tooth 53 is the physical location which is ninety electrical degrees removed from the center of an adjacent main winding pole (along polar axis 38). Thus, this pole group is not in quadrature with the main winding when the main winding is operated in its four pole mode. Note also that this prior art four pole start winding has two pole groups comprising two coils and two pole groups comprising three coils. Further, in the prior art arrangement, a higher speed auxiliary winding 42 comprising two pole groups 37 and 39, is provided for at least starting the motor in its higher speed range mode with the winding disposed radially intermediate the main winding and the four pole start winding. The effective shifting of the four pole start winding and the order of placement of the two start windings limit the amount of wire which can be employed in the four pole start winding. For the illustrated prior art arrangement, particular overcrowding occurred in the slots accommodating turns of three windings therein such as, for example, slots 55, 57, and 19.

A stator winding arrangement according to the present invention, in one form, is illustrated in FIG. 2. An improvement in the distribution of wire among the several slots may be achieved according to the present invention by placing a four pole start winding 59 in quadrature with the main winding 24. As illustrated in FIG. 2, the pole groups such as, for example, the pole group comprising coils 61 and 63 of the four pole start winding have been positioned so that the center of each of the pole groups is displaced 90 electrical degrees from the four pole polar axes 36 and 38 of the main winding. Thus, the four pole start winding is in quadrature with the main winding. Positioning of the coils such as the coils 61 and 63, of the four pole start winding alleviates the overcrowding in slots such as slots 19, 55, and 57 which, in the previous arrangement illustrated in FIG. 1, contained conductors of three different windings. Still further, the order of placement of the four pole start winding and a two pole start winding 60 has been reversed from the prior arrangement illustrated in FIG. 1. The illustrated stator assembly arrangement of FIG. 2 allows formation of the four pole start winding from a larger size or diameter conductor thereby improving operating efficiency as will be discussed more fully hereinbelow.

A multi-speed motor is frequently operated predominantly at only one of its possible operating speeds. For example, a two pole or four pole motor which is employed in a compressor drive environment, may be operated in the low speed four pole mode about seventy to ninety percent of its operating time. Motors of this type often have their auxiliary or start windings energized during both the start and run conditions of the motor. Accordingly, any reduction in the losses associated with operating the most frequently employed start winding, particularly without deleteriously affecting the efficiency in the other speed mode, is highly desirable. A reduction in start winding resistance by, for example, forming that winding of larger cross-sectional area wire will reduce the so called $I^2R$ losses associated with that winding. However, in the four pole prior art configuration discussed in reference to FIG. 1, such an increase in wire size for the auxiliary four pole winding has not been possible until now. The stator assembly 12 of FIG. 2 allows use of an increased wire size for the four pole start winding 59, without inducing any substantial losses in association with the other windings, by: shifting of each pole group of the four pole start winding 59 effectively by one-half tooth (i.e., as compared to the four pole start winding 41 of FIG. 1) thereby positioning the winding in quadrature with the main winding; reversing of the order of placement of the four pole start winding 59 and the two pole start winding 60 so that the four pole start is positioned between the main winding and the two pole start winding; and redistributing the conductor turns of the two pole start winding among several coils of the start winding.

As illustrated in FIG. 2, the radially outermost winding is again the main or running winding 24 which includes the two pole groups comprising coils 25-28 and coils 29-32. The optional extended main winding coils 33 and 35 are also provided. The lower speed or four pole start winding 59 comprising four pole groups comprising coils 71, 73, coils 75, 77, coils 79, 81 and coils 61, 63, respectively, is positioned radially inside the main winding and lies radially outside the higher speed range start winding 60 which comprises the two pole start coil groups 87 and 89. Further, coil groups such as, for example, the coil group comprising coils 71 and 73, are seen to be in quadrature with the four poles created by the main winding during the four pole operational mode; that is, each of four pole winding coil groups are symmetrically positioned (or have their centers displaced 90 electrical degrees) relative to the polar axes 36 and 38 of the main winding during four pole operation. For reasons which will become even more apparent in the discussion of FIGS. 3-8, this quadrature placement of the four pole auxiliary winding allows a wire of cross-section greater than otherwise possible to be employed in forming the lower speed range start winding, thereby increasing the overall motor operating efficiency. As also illustrated in FIG. 2, the low speed start winding 59 occupies a lesser number of total slots per pole (4 slots) than the number of core slots per pole occupied by the higher speed range start winding 60 (8 slots). The occupation of a lesser number of slots by each pole of the four pole start winding allows greater latitude in redistributing the number of wire turns within each coil of the two pole start winding coil groups 87 and 89 to provide a better balance in the percentage of slot fill (i.e., of wire conductor) among the several stator core slots.

As discussed previously in reference to FIG. 1, the prior four pole start winding 41 has two of its four pole groups formed with three coils occupying six core slots. With this prior stator assembly arrangement, an uneven distribution of conductors among the slots occurs; that is, some slots have only a small amount of wire conductor disposed therein while slots such as, for example, slots 19, 55, 57, 90, 92, 94, 96, and 98 have conductors of three different windings accommodated therein and are particularly overcrowded. With the stator assembly 12 of FIG. 2 which is fabricated according to the present invention, the four pole start winding 59 is positioned in quadrature with the main winding 24 and has each pole group such as, for example, the pole group comprising the coils 61 and 63, formed of only two coils. This stator assembly arrangement eliminates the overcrowding of conductors in the slots 19, 55, 92 and 98 which are now occupied by conductors of only two different windings. Still further, overcrowding can also be reduced in the slots 57, 90, 94, and 96, even though these slots have conductors of three different windings accommodated therein, by redistributing conductors of the two pole start winding 60 so that fewer conductor turns are located in these slots while disposing more conductor turns of this winding in other slots of the core. Because the illustrated stator assembly is generally utilized in a capacitor run motor, a run capacitor will be connected in series with the two pole start winding during the motor run mode; thus, the redistribution of turns of the two pole start winding does not substantially affect the overall motor operation since the two pole start winding will be primarily capacitance reactance limited. By establishing a more even distribution of conductors among the several slots, more slot space is created thereby allowing the four pole winding to be formed with larger size wire or conductor for improving efficiency. It has also been found that in some arrangements, sufficient slot space is made available for also allowing an increase in wire size for the main winding which still further improves efficiency. Motors fabricated in accordance with the above-discussed approach of positioning the four pole start winding in quadrature with the main winding have shown improvements in efficiency ranging from about 0.5 to 1.5 points. Such increases in efficiency are significant in motors of this type since such motors were already of a high efficiency variety prior to incorporation of the abovediscussed fabrication approach of the present invention.

Stator assemblies, of the type thus far discussed, may be fabricated by inserting wound coils into selected core slots. Such coil insertion techniques may be performed sequentially whereby only one pole group or one winding having several pole groups is inserted at one time with the other windings being similarly inserted in subsequent stages or steps. Alternatively, all of the windings or any part of the windings may be inserted in one step as desired for a particular stator configuration. For simplicity, it is assumed that the stator assembly 12 of FIG. 2 is fabricated by inserting the main winding 24 in one step; thereafter, the four pole start winding 59 is inserted in a second step; and lastly, the two pole start winding 60 is inserted in yet a third step. However, the principles and techniques of the present invention are also applicable to other coil insertion sequences including the simultaneous insertion of all stator windings. Coil insertion equipment that may be utilized may be of a type such as, for example, illustrated in Mason U.S. Pat. No. 2,934,099 or Hill U.S. Pat. No. 3,324,536 and the entire disclosures of these patents are incorporated herein by reference.

In order to maximize the amount of conductor wire within a stator assembly to achieve high efficiency, each winding is often inserted separately with conductors of each winding compressed or pressed back into their respective slots prior to insertion of another winding. It has been determined that when such an insertion and press back process is employed utilizing typical coil insertion equipment of the type disclosed in the aforementioned patents, the ratio of the compressed cross-sectional area of conductor being inserted into a stator core slot during a first insertion pass of such equipment to the total cross-sectional area available within the slot to receive conductor material is generally limited to about 0.5. For a second pass of such insertion equipment, this ratio is reduced to between 0.42 and 0.45 for the same slot. For a third pass, this ratio is still further reduced to between 0.35 and 0.4 for the same slot. These values were arrived at after giving due consideration to possible wire damage during the process of pressing the wire into the slots and after giving due consideration to the fact that wire tends to spring back after being inserted into the slot, thereby causing the wire to occupy an area greater than the area occupied by the wire in its compressed state.

FIGS. 3-8 illustrate wire conductors of the main winding 24, four pole start winding 59, and the two pole start winding 60 (FIG. 2) during the various stages of the insertion or disposition process. In FIG. 3, a main winding coil 25 is illustrated after it has been inserted and pressed in place in the slot 57. FIG. 4 illustrates the spring back action of the main winding coil after the coil has been pressed back into the slot. Each of FIGS. 3-8 illustrate the exemplary slot 57 which first receives the main winding coil 25 on a first pass or insertion step. In FIG. 5, a four pole start winding coil 100 is illustrated after it has been inserted into the slot 57 and pressed in place. FIG. 6 illustrates the coils 100 and 25 in their sprung back position after they have been pressed. In FIG. 7, the two pole start winding coil 102 is illustrated after it has been inserted and pressed in place in the slot 57. FIG. 8 illustrates all three of the coils in their sprung back position. As shown in FIG. 8, the conductors of the three coils substantially fill slot 57. In a similar manner, a four pole start coil 104 and a two pole start coil 106 are illustrated for adjacent slot 108. As can be seen from the action of the conductors of the windings during the various steps of the insertion and pressing steps, an increase in four pole start winding conductor material within a slot such as the illustrated slot 57 is attainable by inserting the four pole start winding prior to insertion of the two pole start winding. By reversing the order in which the two start or auxiliary windings 59 and 60 are inserted (reversed from the prior art arrangement of FIG. 1), the cross-sectional area of the four pole start winding conductors within a slot can be increased thereby allowing such winding to be formed with wire having an optimum cross-sectional area and of a larger diameter. The larger diameter wire decreases the $I^2R$ losses associated with the four pole start winding. Because the four pole start winding is generally used more frequently than the two pole start winding, the overall operating efficiency of a motor having a stator assembly such as the stator assembly 12 of FIG. 2 is thereby significantly increased. Motors fabricated in accordance with the above-discussed reversal of start windings approach have shown significant increases in efficiency of from about 0.5 to about 1.5 points.

A specific application of the above-mentioned empirical results to a hypothetical numerical example will clarify the advantage in reversing the order of appearance or disposition of these two start windings in a stator core slot. Taking the higher values in the empirical percentage ranges, namely that fifty percent of the available slot space may be filled on a first pass, forty-five percent of the remaining space filled on the second pass, and forty percent of the still remaining space filled on the third pass, a hypothetical slot of one hundred circular mils in cross-sectional area could receive fifty circular mils of main winding. Again, hypothetically, if at least ten circular mils of two pole start winding are required, the maximum amount of wire that could be inserted on the third pass is forty percent of forty circular mils, or sixteen circular mils of four pole winding. If, however, according to the present invention, the four pole winding is placed in the slot before the two pole winding is placed in that slot, twenty circular mils of four pole winding could be inserted with this being less than forty-five percent of the fifty circular mils available. Thereafter, a maximum of twelve circular mils of two pole start winding could be inserted. While an object of the present invention is to increase the cross-sectional size and therefore reduce the losses associated with the more frequently used, in this example, four pole winding, the specific numerical example increases the amount of each start winding which may be placed in the slot.

As another example, in a known single phase alternating current pole changing motor of the type referred to earlier, the main winding was inserted at fifty percent slot fill and then a maximum amount of two pole start winding was inserted on the second pass. Thus, for 100 units of initially available slot space, 50 units are occupied by a main winding and (100−50) (0.45)=22.5 units are occupied by a two pole start winding for a total slot occupation of 72.5 units after the second pass. This leaves (100−72.5) (0.40)=11 units of slot area for inserting conductors of a four pole start winding on the third pass. Applying the techniques of the present invention to this particular example will allow about twice as much four pole start winding conductor material to be inserted and since the two pole start may have its wire conductors distributed over more slots, the detriment to the less frequently used two pole start winding will be slight because the start windings are primarily capacitance reactance limited in a capacitor run motor.

Three motors were fabricated in accordance with the known prior art winding arrangement illustrated in FIG. 1. The motors were operated as capacitor start, capacitor run motors with the main winding, extended main winding and two pole start winding being energized during start and run conditions of the motor for high speed operation and with the main winding and four pole start winding being energized during start and run conditions of the motors for low speed operation. Such motors included a stator core having 24 slots and a stack height (or axial length) of 5 inches. The main winding 24 of each motor was formed with 0.0605 inch diameter copper wire. Each pole group of the main winding had coils with (from innermost to outermost coils) 22, 24, 24 and 26 turns, respectively. The extended main winding comprised two coils each having 10 turns of two parallel connected strands of copper wire with each strand being 0.0571 inches in diameter. A two pole start winding 42 was formed with 0.0359 inch diameter copper wire. Each pole of the two pole start winding had coils with (from innermost to outermost coils) 15, 16, 16 and 34 turns, respectively. The four pole start winding 41 was formed with 0.0359 inch diameter copper wire. Two of the poles of the four pole start winding were formed with three coils each with the coils having (from innermost to outermost coils) 20, 23 and 42 turns, respectively. Each of the other two pole groups of the four pole start winding had two coils with the inner coil having 20 turns and the outer coil having 23 turns. The total weight of the wire contained in the windings was 6.92 pounds. Test results showed that the three motors had four pole operating efficiencies of 79.1, 79.1 and 79.2 (percent), respectively, at a load equal to 155 ounce-feet. The three motors had two pole operating efficiencies of 86.2, 86.1 and 86.3 (percent) respectively, at a load equal to 177 ounce-feet.

In a reduction to practice in accordance with the present invention, two motors were fabricated having a winding arrangement as illustrated in FIG. 2. The motors were operated as capacitor start, capacitor run motors with the main winding, extended main winding and two pole start winding being energized during start and run conditions of the motor for high speed operation and with the main winding and four pole start winding being energized during start and run conditions of the motors for low speed operation. Each motor included a stator core having 24 slots and a stack height (or axial length) of 5 inches. The main winding 24 of each motor was formed with copper wire having a diameter of 0.0641 inches. Each pole group of the main winding had coils with (from innermost to outermost coils) 21, 25, 25 and 27 turns, respectively. Each motor also had the extended main coils 33 and 35 with each coil formed with 11 turns of two parallel connected strands of copper conductor wire with each strand being 0.0571 inches in diameter. The four pole start winding 59 was formed as illustrated in FIG. 2 using 0.0403 inch diameter copper wire with each pole group having an inner coil with 23 turns of wire and an outer coil with 37 turns of wire. The two pole start winding 60 was also formed as illustrated in FIG. 2 using 0.0359 inch diameter copper wire with each pole having coils with (innermost and outermost coils) 21, 21, 12 and 36 turns, respectively. The total weight of wire contained in the windings was eight pounds. Test results showed that the two motors had four pole operating efficiencies of 81.2 and 81.5 (percent), respectively, at a load equal to 155 ounce-feet. The two motors had two pole operating efficiencies of 85.8 and 86.1 (percent), respectively, at a load equal to 177 ounce-feet.

In comparing the motors fabricated according to the present invention with the above discussed prior art motors, it can be seen that motors fabricated according to the present invention had a significant improvement in efficiency for four pole or low speed operation. This improvement in four pole operating efficiency was accomplished without substantially changing or affecting the operating efficiency in the two pole or high speed mode. Utilizing teachings of the present invention, as taught herein, allowed the size of the four pole start winding wire to be increased from 0.0359 inches to 0.0403 inches (diameter). Still further, such teachings enabled an increase in the size of the main winding wire from 0.0605 inches to 0.0641 inches (diameter) which also contributes to the improved efficiency. Yet further, the teachings of the present invention provide an improved distribution of conductor material among the slots which facilitates or improves the manufacturability of such motors while also allowing a greater amount of conductor material to be utilized in the windings.

While the present invention has been described in terms of preferred embodiments and preferred modes of practicing the invention, it should now be readily apparent that numerous modifications will suggest themselves to those of ordinary skill in the art. Accordingly, it is intended by the following claims to cover all such variations which are within the true spirit and scope of this invention.

What I claim as new and desire to secure by Letters Patent of the United States is:

1. A method of manufacturing a two speed motor having an optimized low speed efficiency, wherein the motor includes a magnetic core having a plurality of slots, a main winding, a two pole auxiliary winding, and a four pole auxiliary winding, wherein the windings are particularly adapted for capacitor start, capacitor run energization modes, and wherein the method comprises sequentially placing and positioning coil turn groups of the main and auxiliary windings on the stator core to establish a main winding, and low and high speed auxiliary windings; the steps comprising: placing the winding turns on the main winding coil groups in slots of the core so that the main winding turns are positioned in bottom portions of the slots radially outermost from the bore of the core, and thereby defining polar axes associated with the main winding; developing a four pole auxiliary winding having four coil groups that each have the same number of coils; placing the four pole auxiliary winding coil groups in slots of the core in quadrature relationship with the polar axes of the main winding, and occupying a total number n of the stator slots with turns of the four pole auxiliary winding; developing a two pole auxiliary winding having two coil groups that each have the same number of coils, and wherein the turns of the coil groups thereof are distributed and generally proportioned in accordance with slot areas available for accommodating the two pole auxiliary winding turns; placing the two pole auxiliary winding in quadrature relationship with the main winding and on top of at least some of the turns of the four pole auxiliary winding, and occupying a total number of stator slots with the two pole auxiliary winding that is greater than the number n of slots occupied by the four pole auxiliary winding.

* * * * *